(12) United States Patent
Potasek et al.

(10) Patent No.: US 10,101,234 B2
(45) Date of Patent: Oct. 16, 2018

(54) OPEN DIAPHRAGM HARSH ENVIRONMENT PRESSURE SENSOR (71) Applicant: Rosemount Aerospace Inc., Burnsville, MN (US)

(72) Inventors: David P. Potasek, Lakeville, MN (US); Charles Little, Belle Plaine, MN (US); Weibin Zhang, Burnsville, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 253 days.

(21) Appl. No.: 15/041,243

(22) Filed: Feb. 11, 2016

(65) Prior Publication Data
US 2017/0234752 A1 Aug. 17, 2017

(51) Int. Cl.
G01L 9/00 (2006.01)
G01L 19/06 (2006.01)
G01L 19/14 (2006.01)

(52) U.S. Cl.
CPC ........ *G01L 19/0645* (2013.01); *G01L 9/0052* (2013.01); *G01L 9/0072* (2013.01); *G01L 19/0618* (2013.01); *G01L 19/146* (2013.01); *G01L 19/147* (2013.01)

(58) Field of Classification Search
None
See application file for complete search history.

(56) References Cited

U.S. PATENT DOCUMENTS

| 5,062,302 | A | 11/1991 | Petersen et al. | |
| 5,945,605 | A | 8/1999 | Julian et al. | |
| 6,550,337 | B1* | 4/2003 | Wagner | G01L 9/0042 73/715 |
| 6,938,490 | B2* | 9/2005 | Wagner | G01L 9/0042 73/708 |
| 7,562,580 | B2* | 7/2009 | Rezgui | G01L 9/0055 73/715 |
| 8,371,176 | B2* | 2/2013 | Rozgo | G01L 19/0007 73/727 |
| 8,833,172 | B2* | 9/2014 | Chiou | G01L 9/0052 73/700 |
| 9,013,013 | B1* | 4/2015 | Beer | G01L 19/0069 257/415 |

(Continued)

FOREIGN PATENT DOCUMENTS

| EP | 0553725 A2 | 8/1993 |
| EP | 2816335 A1 | 12/2014 |

OTHER PUBLICATIONS

Extended European Search Report for EP Application No. 17155350.6, dated Jun. 30, 2017, 12 Pages.

*Primary Examiner* — Peter Macchiarolo
*Assistant Examiner* — Jermaine Jenkins
(74) *Attorney, Agent, or Firm* — Kinney & Lange, P.A.

(57) ABSTRACT

A pressure sensor comprising a housing, a diaphragm wafer, and an isolator configured to absorb lateral stress. The diaphragm wafer includes a fully exposed diaphragm, a fluid contact surface, a sensing element, and a support portion, where the support portion and the contact surface define a cavity. The isolator extends laterally from the support portion to the housing. The pressure sensor is easily drainable, eliminating the buildup of particulates, and the diaphragm can be directly wire-bonded to printed circuit boards, eliminating the need for extensive electrical feedthrough.

20 Claims, 9 Drawing Sheets (56) References Cited

U.S. PATENT DOCUMENTS

| | | |
|---|---|---|
| 9,212,054 B1 | 12/2015 | Kwa |
| 9,310,267 B2 * | 4/2016 | Wagner .................... G01F 1/34 |
| 2001/0001550 A1 * | 5/2001 | Bryzek ................ B81B 3/0072 |
| | | 338/36 |
| 2010/0304518 A1 * | 12/2010 | Suminto ............... G01L 9/0042 |
| | | 438/51 |
| 2013/0214370 A1 | 8/2013 | Hussain et al. |
| 2014/0000376 A1 | 1/2014 | Chiou |
| 2014/0238141 A1 | 8/2014 | Brown |
| 2015/0059485 A1 * | 3/2015 | Haag ...................... B81B 7/007 |
| | | 73/725 |
| 2016/0370244 A1 * | 12/2016 | Seto ..................... G01L 9/0051 |

\* cited by examiner

OPEN DIAPHRAGM HARSH ENVIRONMENT PRESSURE SENSOR

BACKGROUND

Pressure sensors must be built for use in a variety of environments. Often, the fluid of interest is not a "clean" fluid, but instead is in a harsh environment, which may contain foreign object debris. Pressure sensors for use in harsh environments must be designed to avoid destruction and clogging of the pressure sensing die used in such environments.

Traditionally, harsh environment pressure sensors used fluid separation membranes to separate the pressure sensing die from the measurement environment where the process fluid of interest was located. The fluid separation membrane, placed between the process fluid field and the sensing die, transfers the pressure of the process fluid to the pressure sensing die in the device. However, to contain isolation oil, these designs relied on expensive hermetically-sealed glassed-in pins to provide feedthrough of electrical signals. Traditional designs also created unwanted pockets in the path to the sensing die, clogging the pressure sensor with external, harsh environment fluid, and foreign objects within the pockets of the pressure sensor. The large coefficient of thermal expansion of the oil in conjunction with the compliance of the isolator created performance errors with pressure readings in such sensors. Additionally, the remote distance of the pressure sensing die itself from the process fluid, due to the space of the oil-filled isolator, created performance errors and delayed response with pressure readings.

SUMMARY

In one embodiment, a pressure sensor assembly includes a housing, a diaphragm wafer, and an isolator configured to absorb lateral stress. The diaphragm wafer comprises a fluid contact surface, a diaphragm located along the surface and configured to deflect in response to pressure, a sensing element that is responsive to deflection of the diaphragm, and a support portion, wherein the support portion and the diaphragm define a cavity. The isolator is connected between the support portion of the diaphragm wafer and the housing such that an inner portion of the isolator is attached to the support portion and an outer portion of the isolator is attached to the housing, and the isolator is parallel to the fluid contact surface.

In another embodiment, a method of manufacturing a pressure sensor includes fabricating a diaphragm wafer comprising a fluid contact surface, a diaphragm located along the surface and configured to deflect in response to pressure, a sensing element that is responsive to deflection of the diaphragm, and a support portion, wherein the support portion and the diaphragm define a cavity; fabricating an isolator configured to absorb lateral stresses; fabricating a housing; connecting the isolator to the housing; and attaching the diaphragm wafer to the isolator, such that the support portion of the diaphragm wafer is attached to an inner portion of the isolator, an outer portion of the isolator is attached to the housing, and the fluid contact surface of the diaphragm wafer is parallel to the isolator.

DETAILED DESCRIPTION

The present invention disclosure describes a pressure sensor that eliminates the need for fluid separation membranes and oil-filled cavities, allows for a sensing die which is open to the environment, and is an easily drainable system. Moreover, the design does not require glassed-in pins to send electrical signals; instead wire-bonds or electrical feedthrough pins can be used to directly access the pressure sensing die. The design utilizes an oil-free isolator which reduces cost and size of the pressure sensor, while increasing efficiency in pressure reading.

Figure 1A:
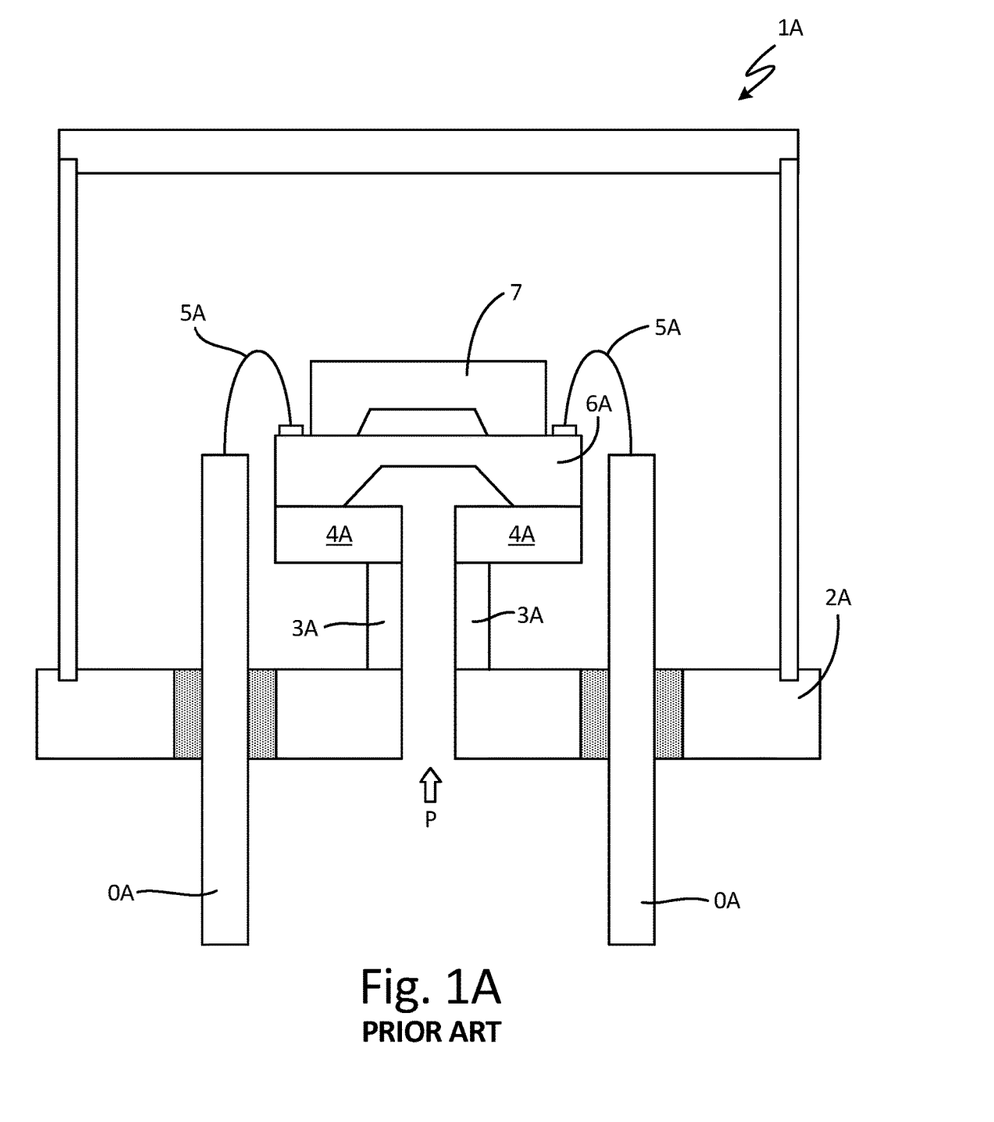
FIG. 1A is a schematic diagram of a traditional pressure sensor assembly as shown in prior art.

FIG. 1A is a schematic sectional view diagram of pressure sensor assembly 1A as found in prior art. Pressure sensor assembly 1A includes housing 2A, pedestal isolator 3A, backing wafer 4A, connections 5A, diaphragm wafer 6A, topping wafer 7, and electrical feedthrough pin 0A. Diaphragm wafer 6A contains a diaphragm and a pressure-sensing element. In this traditional configuration, housing 2A is stainless steel (or similar) housing which encloses the other elements of pressure sensor assembly 1A. Pedestal isolator 3A, which is the traditional version of a pedestal in a harsh environment pressure sensor, is attached to housing 2A and backing wafer 4A. Diaphragm wafer 6A is anchored to backing wafer 4A, and topping wafer 7 is rigidly secured to diaphragm wafer 6A. Connectors 5A are attached to the surface of diaphragm wafer 6A and electrical feedthrough pins 0A. Diaphragm wafer 6A is removed from stress associated by temperature changes of housing 2A, by pedestal isolator 3A and backing wafer 4A.

In this apparatus, as presented in prior art, foreign object damage occurs within the passage of pedestal isolator 3A, backing wafer 4A, and diaphragm wafer 6A. This design suffers from particulate susceptibility. Moreover, the remote distance of the pressure sensing die itself from the process fluid due to the space of pedestal 3A creates performance errors and delayed response with pressure readings in such sensors.

Figure 1B:
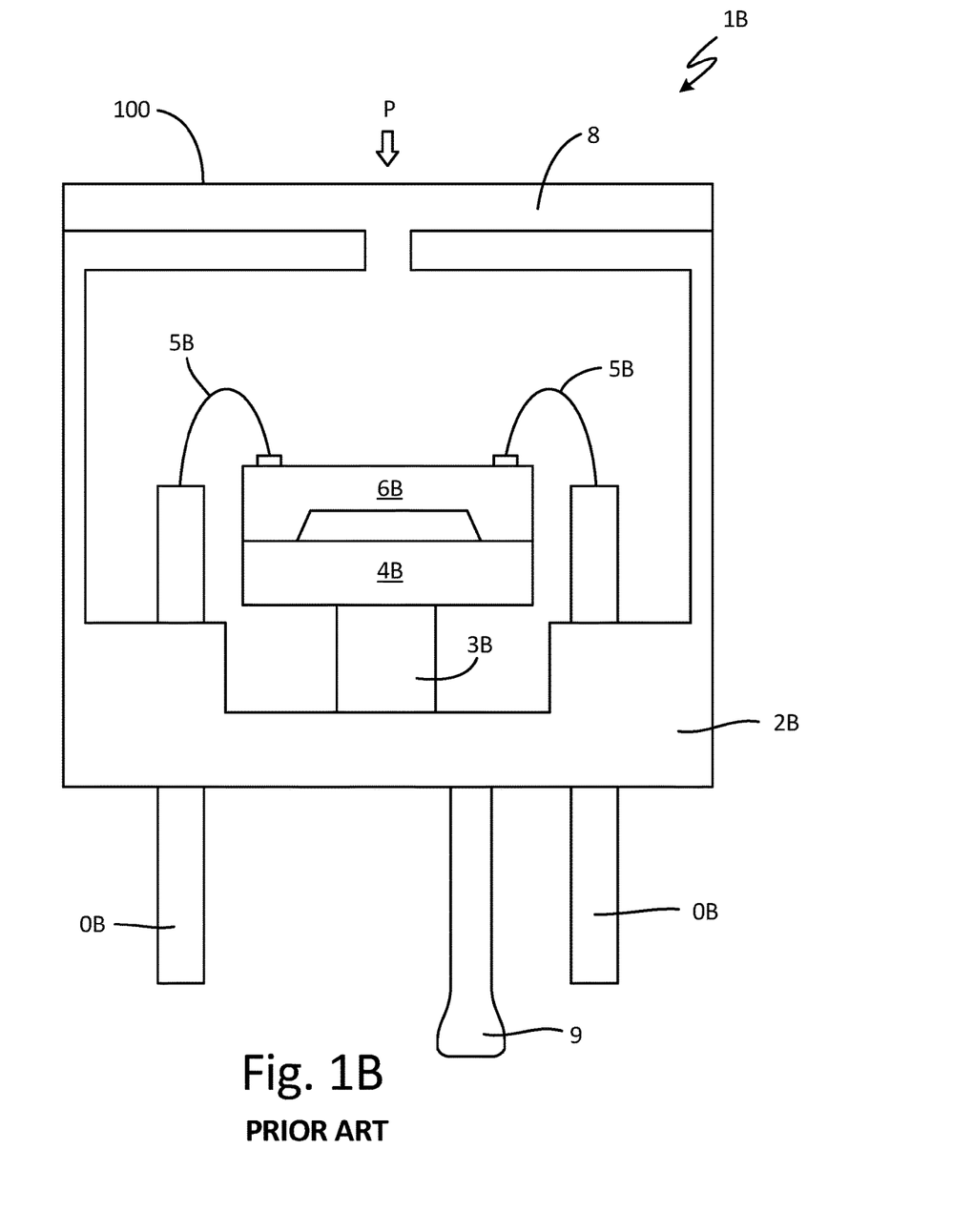
FIG. 1B is a schematic diagram of a traditional pressure sensor assembly in an oil-filled embodiment as shown in prior art.

FIG. 1B is a schematic sectional view diagram of pressure sensor assembly 1B, as described in prior art. Pressure sensor assembly 1B includes housing 2B, pedestal isolator 3B, backing wafer 4B, connections 5B, diaphragm wafer 6B, oil filled cavity 8, oil fill tube 9, electrical feedthrough pins 0B, and oil separation membrane 100. Housing 2B encloses pedestal isolator 3B, backing wafer 4B, connections 5B, and diaphragm wafer 6B. Pedestal isolator 3B is attached to housing 2B and backing wafer 4B. Diaphragm wafer 6B, which contains a diaphragm and a pressure sensing element, is attached to backing wafer 4B. Connections 5B attach to diaphragm wafer 6B and to electrical feedthrough pins 0B. Feedthrough pins 0B run through housing 2B for connection to electronics (not pictured). On an end of housing 2B closest diaphragm wafer 6B, fluid separation membrane 100 encloses pressure sensing assembly 1B, creating oil-filled cavity 8, and prevents exposure of diaphragm wafer 6B to external process fluid. The entire internal compartment of pressure sensor assembly 1B is oil-filled to transfer pressure P of external process fluid to diaphragm wafer 6B.

Oil-filled cavity 8 is the most basic fix to the problems associated with pressure sensor assembly 1A. The oil that is filled into pressure sensor assembly 1B is as inert and clean as possible, with thermal expansion characteristics to reduce error regarding temperature. However, the use of oil-filled cavity 8 drastically increases the amount of space required in the apparatus. Expensive hermetically-sealed glassed-in pins must be included to provide feedthrough of electrical signals outside the oil-filled internal space. The present invention provides an alternative apparatus which solves these problems.

Figure 2:
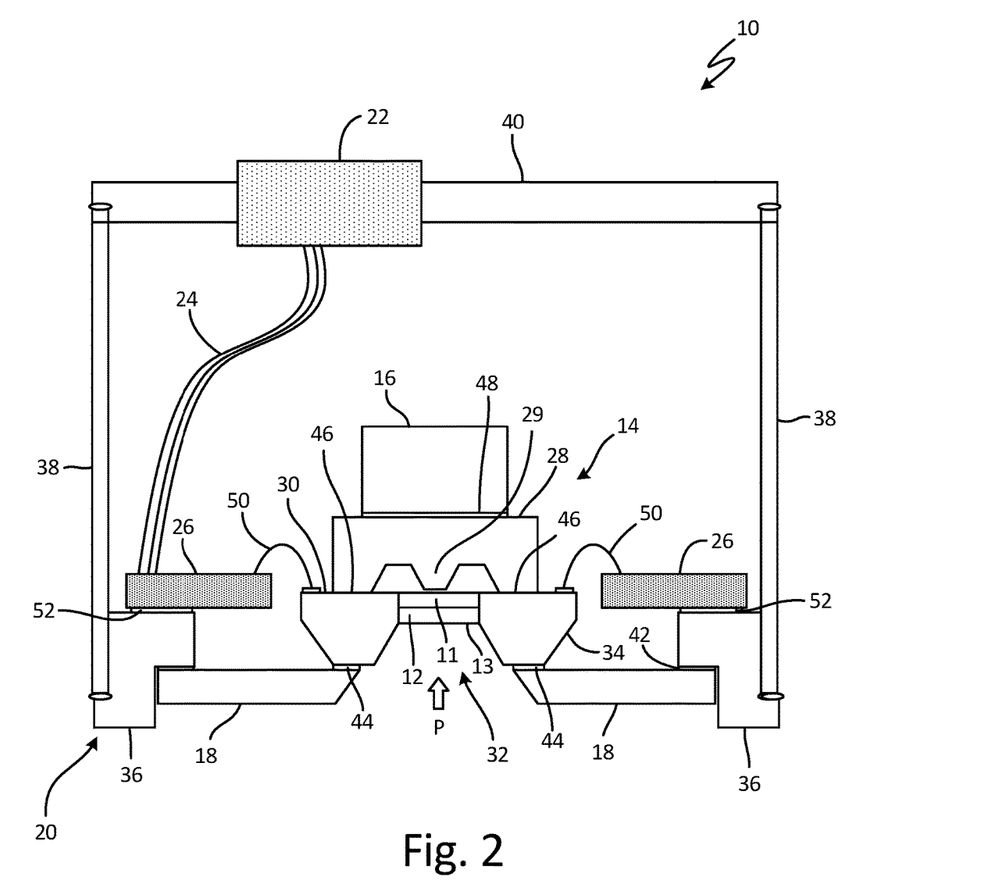
FIG. 2 is a schematic diagram of a pressure sensor with a fully exposed diaphragm.

FIG. 2 is a schematic sectional view diagram of pressure sensor 10, which includes pressure sensing element 11, fully exposed diaphragm 12, a fluid contact surface 13, die 14, over pressure support 16, isolator 18, housing 20, connector 22, wires 24 and printed circuit boards 26. Die 14 includes topping wafer 28 (with over pressure stop 29) and diaphragm wafer 30. Diaphragm wafer 30 includes pressure sensing element 11, fully exposed diaphragm 12, fluid contact surface 13, and support portion 34. Diaphragm 12 and support portion 34 define cavity 32. Housing 20 includes main housing end 36, main housing sidewall 38 and back plate 40.

Main housing end 36 is connected to isolator 18 through braze joints 42. Isolator 18 is connected to die 14 by bonds 44 to support portion 34 of diaphragm wafer 30. Topping wafer 28 is connected to the internal end of diaphragm wafer 30 by frit 46. Over-pressure support 16 is attached to the opposite end of topping wafer 28 with epoxy 48 and is rigidly attached to main housing chamber 20 through a cross-bar or other anchor (not pictured). Die 14 is connected to printed circuit boards 26 by wire-bonds 50, which are directly connected to sensing element 11 of diaphragm wafer 30. Printed circuit boards 26 are attached to main housing end 36 and wires 24. Wires 24 connect printed circuit boards 26 to connector 22, which is placed along back plate 40. Back plate 40 is welded to sidewall 38, which is welded to main housing end 36. Back plate 40, sidewall 38, and main housing end 36, typically made of stainless steel, make up housing 20, which surrounds die 14, over-pressure support 16 and printed circuit boards 26.

Pressure sensor 10 can be deployed in a harsh environment with a process fluid, and is configured to sense the absolute pressure of the process fluid. The process fluid may be a gas, liquid, or both, and may contain small solid particulates. Pressure sensor 10 detects process fluid pressure (P) when the process fluid enters diaphragm cavity 32 and is sensed by diaphragm 12. In some embodiments, diaphragm wafer 30 is silicon. Diaphragm 12, located in the center portion of diaphragm wafer 30, with fluid contact surface 13 facing cavity 32, is fully exposed to the harsh environment. Diaphragm 12 deflects in response to the pressure (P) of the process fluid. Deflection of diaphragm 12 is detected by pressure sensing element 11. Pressure sensing element 11 can be, for example, a piezoresistive Wheatstone bridge or capacitive plates. Topping wafer 28, which is connected to diaphragm wafer 30 by frit 46, provides reference pressure to sensing element 11. Topping wafer 28 is preferably made of silicon or glass (such as a borosilicate glass). In FIG. 2, the reference pressure, between topping wafer 28 and diaphragm wafer 30, is a vacuum. This allows for pressure sensor 10 to detect absolute pressure of the process fluid.

Topping wafer 28 includes over pressure stop 29, which prevents diaphragm 12 from bursting. Over pressure stop 29 in topping wafer 28 limits the length that diaphragm 12 can deflect. In addition, over pressure support 16 reinforces the topping wafer 28 to prevent both the diaphragm 12 and die 14 from bursting if the pressure of the process fluid is too high.

Over-pressure support 16 is attached to die 14 to avoid over-pressurization of die 14. Over-pressure support 16 is rigidly attached to both topping wafer 28 and main housing chamber 20 to maintain stability. Over-pressure support 16 can be attached to main housing 20 via a cross-bar or other means to anchor over-pressure support 16 to main housing 20. The rigid attachment of over-pressure support 16 to housing 20, and the attachment of isolator 18 to housing 20 allows for die 14 to be rigidly placed inside main housing 20. Die 14 is attached firmly to over-pressure support 16, which is secured to main housing 20; additionally, die 14 is attached to isolator 18, which is firmly attached to main housing 20. Thus, die 14 is securely in place within pressure sensor 10 and is not easily dislodged. Instead of topping wafer 28 and diaphragm wafer 30 moving with pressure, only diaphragm 12 located in cavity 32 will deflect from pressure due to the process fluid. Over-pressure support 16 prevents die 14 from bursting if the pressure of the process fluid is too high.

Isolator 18 is a thin material designed to absorb lateral stresses. Isolator 18 can be made of an iron-nickel alloy, silicon, glass, ceramic, stainless steel foil or a combination thereof. Isolator 18 attaches inwardly from main housing end 36 to diaphragm wafer 30. Isolator 18 absorbs lateral stresses and protects die 14 from taking those stresses. Isolator 18 will flex with lateral stresses, protecting diaphragm 12. Diaphragm 12 will deflect pressure P from the process fluid of interest, and pressure sensing element 11 will detect that pressure. Pressure from the process fluid will also be applied to isolator 18, and isolator 18 will move with that pressure. However, the signal determined by die 14 will not be reduced, as diaphragm 12 is directly exposed to the process fluid and will move with the pressure P of the process fluid. Isolator 18 is directly connected to housing end 36, and further absorbs thermal stresses associated with that connection.

From the point of attachment of isolator 18 to diaphragm wafer 30, diaphragm wafer cavity 32 converges to an apex, where diaphragm 12 is located on contact surface 13. The divergence of cavity 32 as it approaches the harsh environment ensures that diaphragm 12 is fully exposed to the process fluid, making the readings of pressure sensing element 11 more accurate. As the fluid enters cavity 32, there are no pockets, corners, or pathways in which particles contained in dirty fluid get "stuck" or trapped. Because the sensor is fully exposed and has no cavities able to contain particulates in the process fluid, the particulates self-shed, do not accumulate, and do not interfere with the pressure measurement.

In prior art, the existence of such cavities or pockets made pressure sensing assemblies difficult to drain. Over time, build-up of dirty fluid in cavities would cause errors in pressure readings. But in the present invention, there are no unwanted cavities in or near diaphragm 12. For this reason, process fluid cannot get stuck in pockets in or near diaphragm 12 or isolator 18. The process fluid is easily drainable from cavity 32, as the entrance through isolator 18 is wider than cavity 32 and diaphragm 12.

Neither can foreign object damage occur. While prior designs allowed for foreign object damage from process fluids in harsh environments, there is nowhere in this design for such objects to get lodged. Diaphragm 12 is fully exposed to the harsh environment and the process fluid. This makes pressure sensor 10 easily drainable. Additionally, this reduces error in pressure sensing, as the die is in direct contact with the environment it is measuring.

Printed circuit boards 26 are attached directly to die 14 via wire-bonds 50. When diaphragm 12 reacts to the pressure of the process fluid, it transmits a signal through wire-bonds 50 to printed circuit boards 26. In turn, printed circuit boards 26 transmits the signal through wires 24 to connector 22, where the signal is interpreted and converted to a readable pressure measurement.

Figure 3:
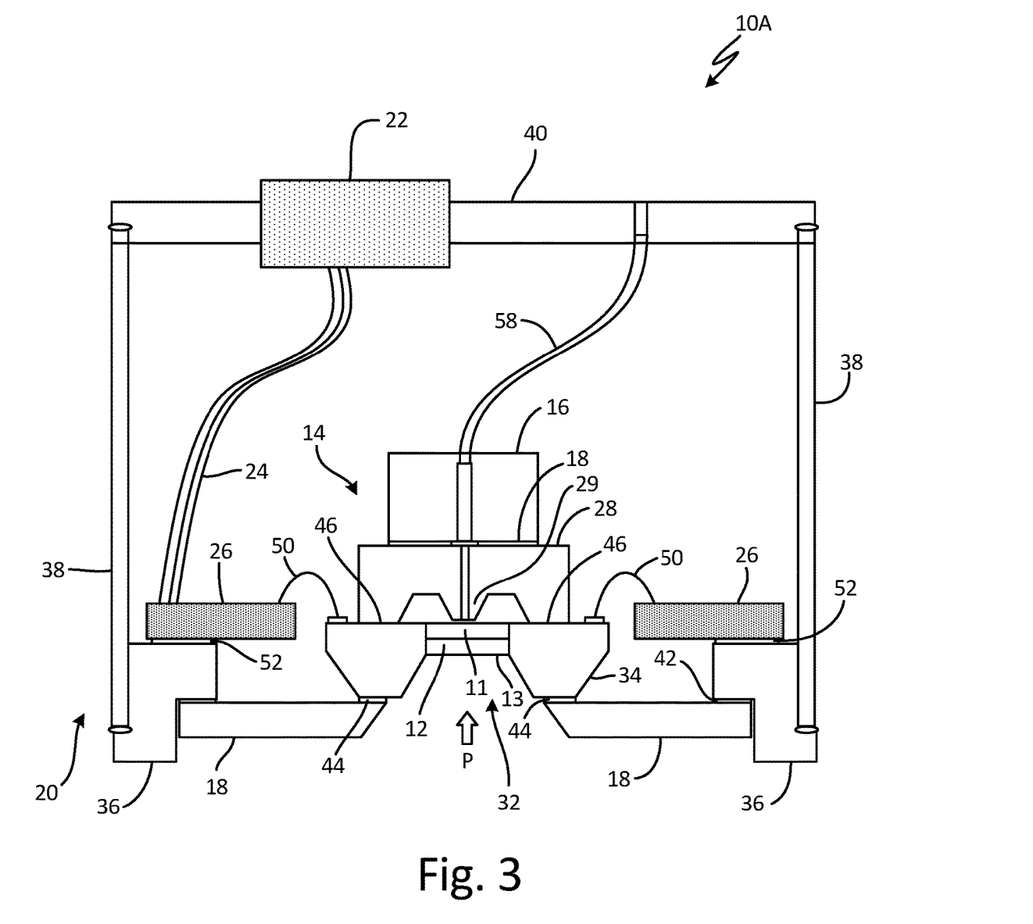
FIG. 3 is a schematic diagram of a pressure sensor with a fully exposed diaphragm in a gage pressure configuration.

FIG. 3 is a schematic sectional view diagram of pressure sensor 10A with fully exposed diaphragm 12, in a gage pressure configuration. Pressure sensor 10A in FIG. 3 is an alternative embodiment of pressure sensor 10 in FIG. 2. The components of FIG. 3 are the same as those described in reference to FIG. 2, and are connected in the same fashion, except where otherwise described here. In FIG. 3, pressure sensor 10A is configured to sense gage pressure of the process fluid, as opposed to absolute pressure. Tubing 58 runs from an external atmosphere through back plate 40, over pressure support 16, and topping wafer 28 to provide an atmospheric pressure reference to diaphragm 12.

Pressure sensor 10A is set up for a gage configuration where the pressure between topping wafer 28 and diaphragm wafer 30 is equal to reference pressure, typically atmospheric pressure (as opposed to the vacuum in FIG. 2). This is not a true differential set up, because the reference side of pressure sensor 10A, next to back plate 40 of housing chamber 20 is a "clean" side; it is not immersed in the harsh environment which contains the fluid of interest. The other side of pressure sensor 10A, which contains isolator 18 and diaphragm 12, is exposed to the harsh environment and the process fluid.

Figure 4:
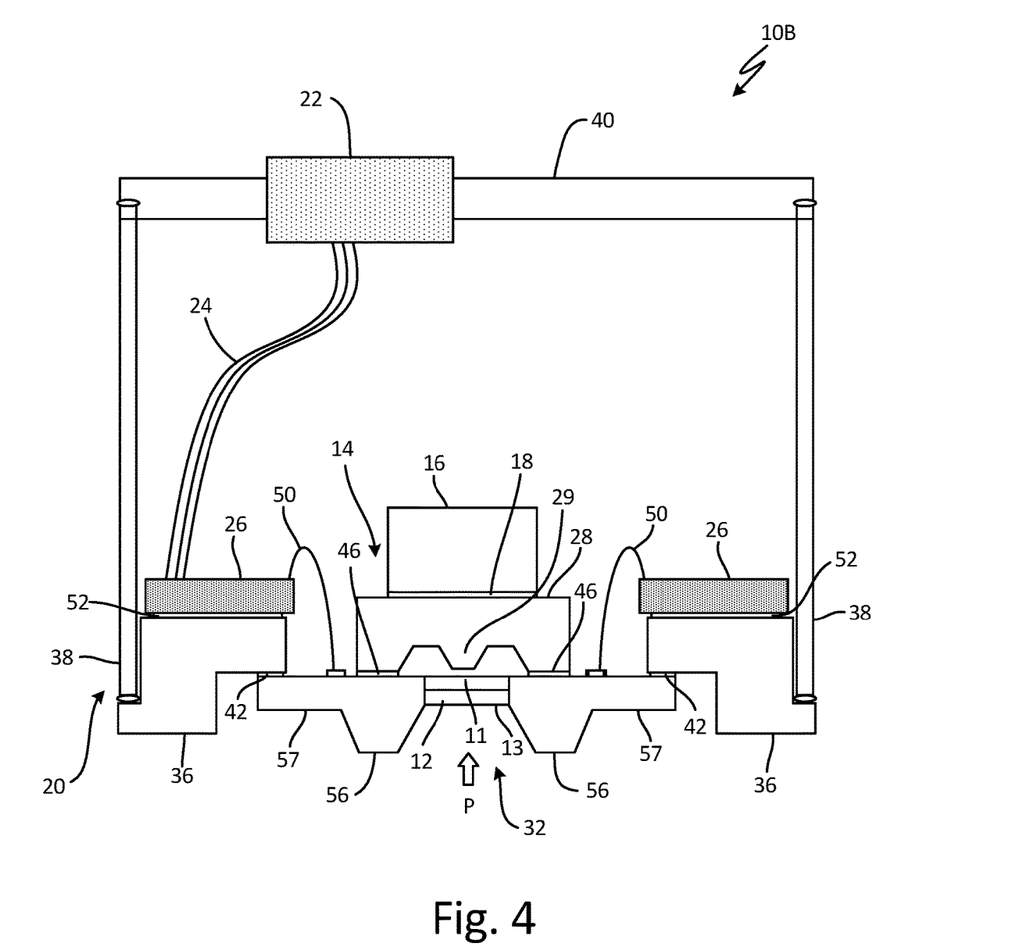
FIG. 4 is a schematic diagram with a fully exposed diaphragm including an integral silicon isolator.

FIG. 4 is a schematic sectional view diagram of pressure sensor 10B with fully exposed diaphragm 12, where an isolator is fully integrated with a diaphragm wafer, resulting in integrated wafer 56. Pressure sensor 10B in FIG. 4 is an alternative embodiment of pressure sensor 10 in FIG. 2. The components of FIG. 4 are the same as those described in reference to FIG. 2, and are connected in the same fashion, except where otherwise described here. Pressure sensor 10B in FIG. 4 contains fully integrated wafer 56, which is an isolator integrated with a diaphragm wafer. Both the isolator and the diaphragm wafer are made of silicon, and are one continuous piece. Here, isolator portion 57 is a thin, flexible extension of integrated wafer 56. Integrated wafer 56 is large enough to allow bending and flexing of isolator portion 57, but prevent unwanted bending of diaphragm 12 in the center portion of the continuous silicon piece. Integrated wafer 56 allows for more flexibility of material in creation of pressure sensor 10B.

Figure 5:
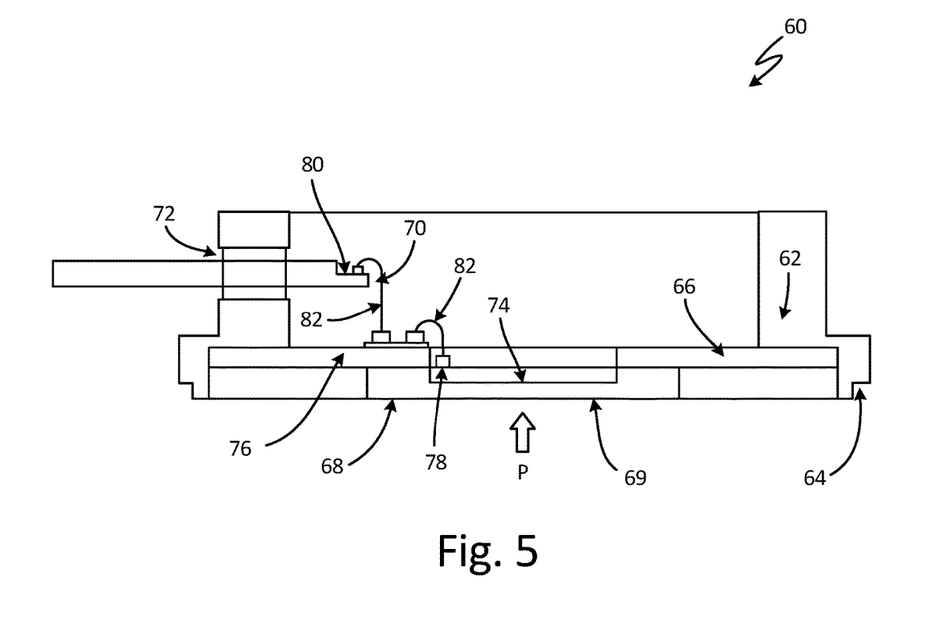
FIG. 5 is a schematic diagram of another embodiment of a pressure sensor with a fully exposed diaphragm, in a configuration with electrical feedthrough pins.
Figure 6A:
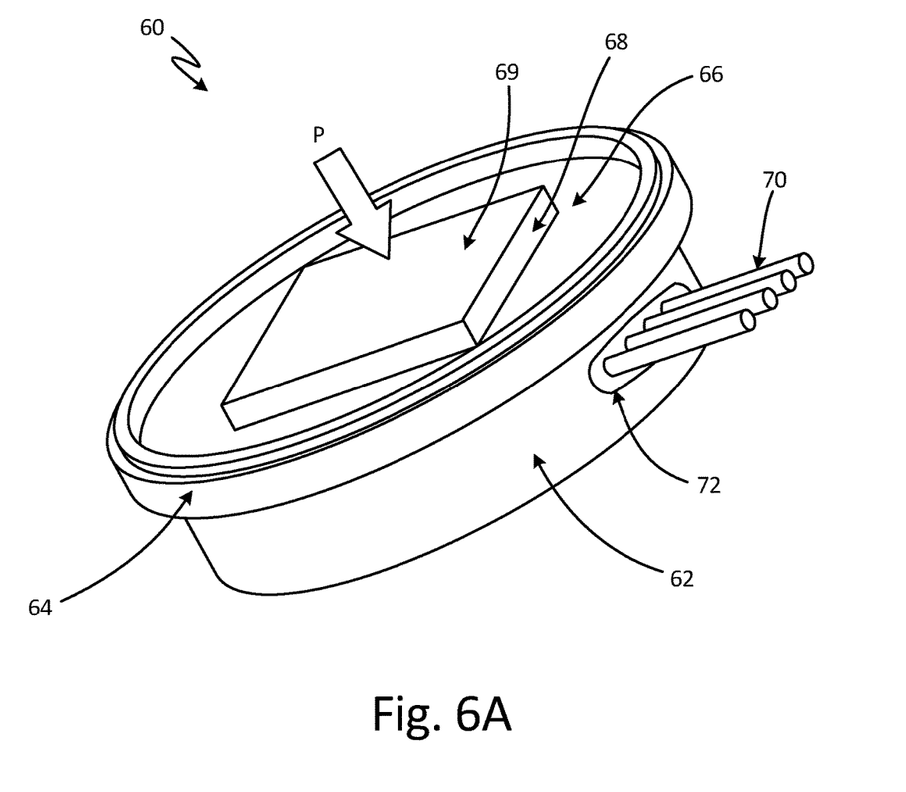
FIG. 6A is a perspective diagram of the pressure sensor in FIG. 5.
Figure 6B:
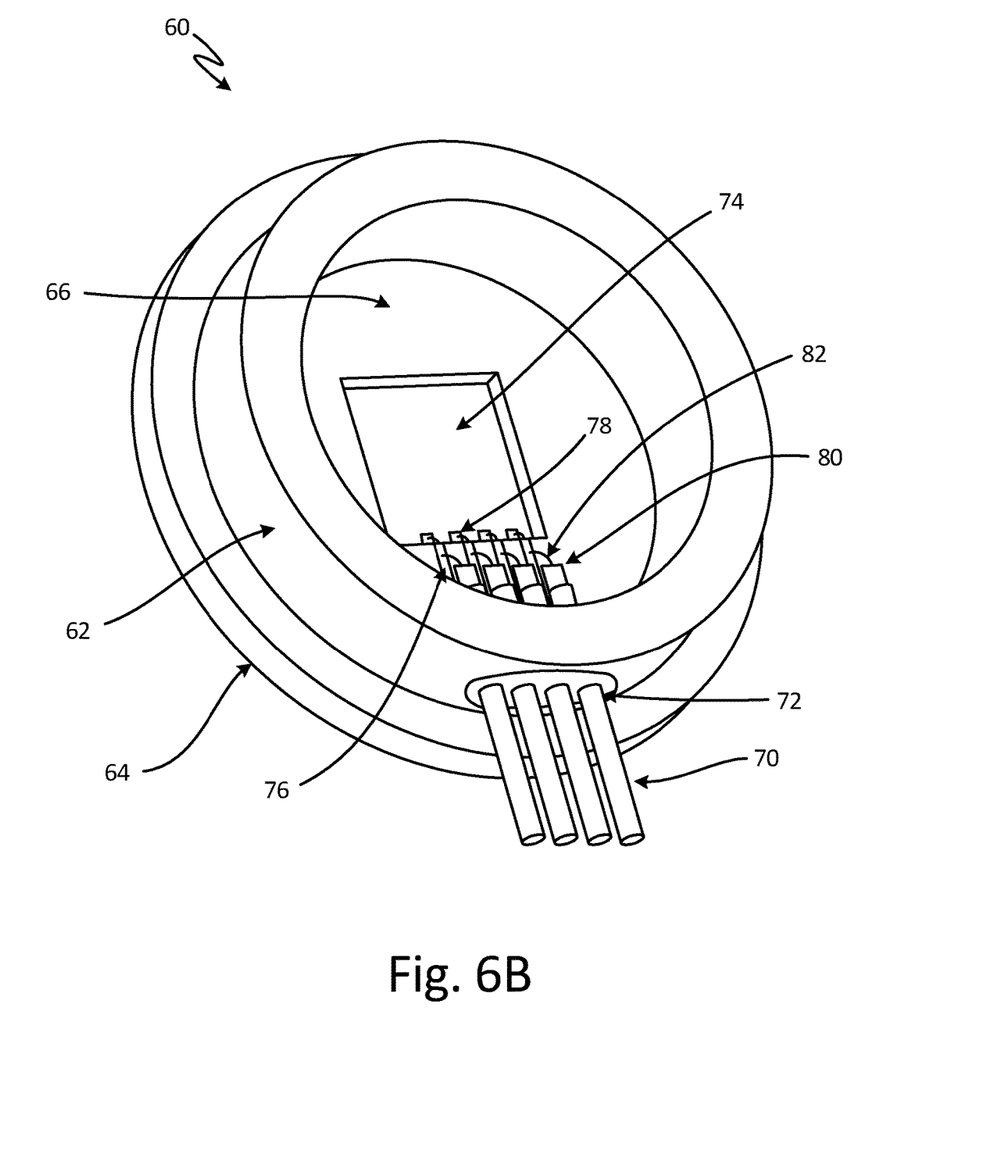
FIG. 6B is a perspective diagram of the pressure sensor in FIG. 5 from the side opposite FIG. 6A.

FIGS. 5, 6A and 6B show pressure sensor 60, which is in a different configuration than pressure sensor 10 of FIG. 2. FIG. 5 is a schematic sectional view of pressure sensor 60. Pressure sensor 60 includes housing 64, isolator 66, diaphragm wafer 68, electrical feedthrough pins 70, non-conductive seals 72, pressure sensing element 74, bond pads 76, 78, pin 80, and wire-bonds 82. Housing 62 encircles all other components of pressure sensor 60. Weld feature 64 is part of housing 62. Isolator 66 is attached to the inside of housing 62, and diaphragm wafer 68 is attached to isolator 66. Electrical feedthrough pins 70 are connected to diaphragm wafer 68 through a series of bond pads 76, 78 and wire-bonds 82. Electrical feedthrough pins run through the side of housing 62 and are sealed to housing 62 through non-conductive seals 72.

FIGS. 6A and 6B are perspective diagrams of pressure sensor 60 from both sides. FIG. 6A shows housing 62, weld feature 64 of housing 62, isolator 66, diaphragm wafer 68, diaphragm 69, electrical feedthrough pins 70, and seal 72. FIG. 6B shows the opposite side of FIG. 6A, and shows housing 62, weld feature 64, isolator 66, electrical feedthrough pins 70, seals 72, pressure sensing element 74, wire-bond pads 76, 78, pin 80, and wire-bonds 82. All three figures will be discussed together.

Pressure sensor 60 can be deployed in "dirty" environments to detect the pressure of process fluid. Pressure sensor 60 detects process fluid pressure (P) when the fluid pushes against diaphragm 69, located in the center of diaphragm wafer 68. Diaphragm 69 is fully exposed to the environment. Pressure sensing element 74, on the opposite side of diaphragm, will sense the pressure and convert it to useable electrical signals. Pressure sensing element 74 can be a Wheatstone bridge or capacitive plates.

Isolator 66 functions similarly to isolator 18 of FIG. 2. Isolator 66 is a thin material designed to reduce lateral stresses, and is preferably made of silicon. Isolator 66 is bonded to diaphragm wafer 68, and then bonded to housing 62. The outer diameter of isolator 66 is coated so it can bond to housing 62. Isolator 66 has a chemically milled hole to allow wiring access. Isolator 66 reduces lateral stresses to isolate the diaphragm wafer 68 (including diaphragm 69 and pressure sensing element 74), and will flex and bend with those stresses. However, the signal to pressure sensing element 74 will not be reduced, as diaphragm 69 is directly exposed to the process fluid and will move with the pressure of the process fluid. Isolator 66 is in direct contact with housing 62, and also reduces stresses associated with that connection.

Housing 62 is preferably an alloy with a coefficient of thermal expansion matched to silicon. If housing 62 is left open to the environment (as pictured), it can be used in a gage configuration. Alternatively, a back plate can be welded to housing 62 to create a vacuum environment for use to determine absolute pressure. Housing 62 contains a weld feature 64 that allows the entire pressure sensor 60 to be inserted into a pneumatic or hydraulic fitting, or another adapter, and circumferentially seam welded shut.

Housing 62 must allow for electrical feedthrough pins 70, as there are no internal printed circuit boards in this embodiment. Electrical feedthrough pins 70 are preferably made of an iron-nickel alloy, and provide electrical conductivity from pressure sensing element 74 to transducer electronics (not pictured). Each pressure sensing element 74 will require four pins 70 for each corner of a Wheatstone bridge. Electrical feedthrough pins 70 are electrically insulated by non-conductive seals 72, which may be made of borosilicate glass, to housing 62. Pressure sensing element 74 is electrically connected to electrical feedthrough pins via wire-bond pads 76, 78 and wire-bonds 82. Wire-bond pads are optimally an aluminum or gold alloy. Bond pads 76 are a thin coating which provides electrical continuity and wire bond connection between pressure sensing element 74 and electrical feedthrough pins 70. Bond pads 78 are a thin coating which provides electrical continuity between the Wheatstone bridge of pressure sensing element 74, wire-bonds 82, and electrical feedthrough pins 70. Gold plated iron-nickel alloy pins 80 are flats on the ends of electrical feedthrough pins 70 that provide flat surfaces for wire-bond attachment to transducer electronics, where the pressure signal detected by diaphragm 69 and pressure sensing element 74 is transmitted for interpretation.

Figure 7:
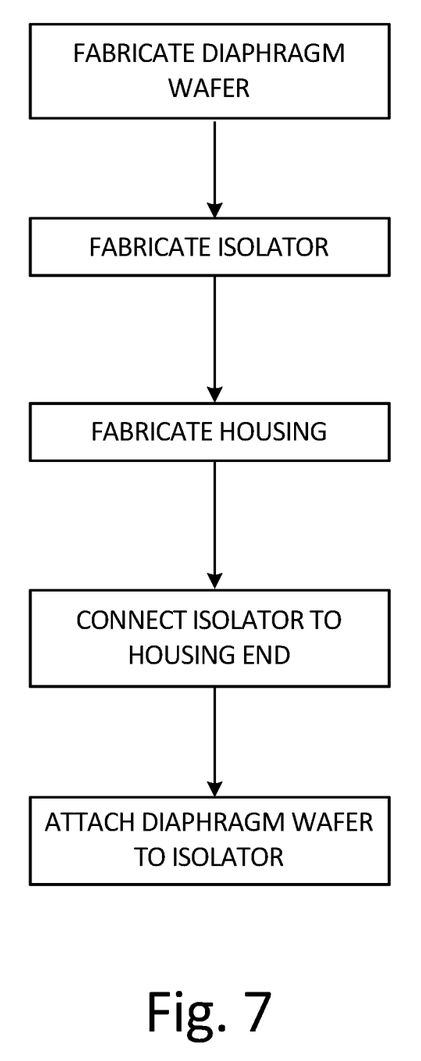
FIG. 7 is a flow chart showing a method of making a pressure sensor.

FIG. 7 shows a method of making a pressure sensor. First, a diaphragm wafer is fabricated. The diaphragm wafer includes a fluid contact surface, a diaphragm located along the surface and configured to deflect in response to pressure, a sensing element that is responsive to deflection of the diaphragm, and a support portion, where the support portion and the diaphragm define a cavity. The diaphragm wafer is preferably made of silicon, and the pressure sensing element may consist of capacitive plates or a pizeroresistive device.

Next, an isolator is fabricated. The isolator is preferably made of an iron-nickel alloy, silicon, glass, ceramic, stainless foil, or some combination thereof, such that the isolator is configured to absorb lateral stresses. A housing is fabricated next. The housing includes a housing end and a sidewall, and may optionally include a back plate. The housing may be made of an iron-nickel alloy, or of stainless steel. The isolator is then connected to the housing. Specifically, an outer portion of the isolator is attached to the housing end. Then, the diaphragm wafer is attached to the isolator by attaching the support portion of the diaphragm wafer to the isolator.

Method 86 can be completed in two optional routes for completing creation of the pressure sensor. To create pressure sensor 10 from FIG. 2, a topping wafer and an over-pressure support are fabricated. The topping wafer is preferably made of silicon or silicon-glass. The topping wafer is bonded to the diaphragm wafer by frit. Then, hundreds of individual sensor die are sawn out of the wafer. After this attachment, the die (comprising the topping wafer and the diaphragm wafer) is attached to the isolator.

Next, printed circuit boards are attached to the housing, and are attached to the diaphragm wafer through wire-bonds, the printed circuit boards are then connected to a connector through wires. This is followed by the attachment of the over-pressure support to the housing through a cross-bar or anchor, and to the topping wafer through epoxy. Finally, the housing end is welded to the sidewall and a back plate to complete the housing.

Alternatively, to create pressure sensor 60 from FIG. 5, the housing should be an iron-nickel alloy. The second method does not require the use of a topping wafer, over pressure support, or printed circuit boards. In this method, the isolator contains one or more chemically milled holes through which electrical feedthrough pins are run. The holes are then sealed, optionally with borosilicate glass seals. After the attachment of the diaphragm to the isolator, the diaphragm is bonded to the one or more iron-nickel alloy electrical feedthrough pins, through a series of bond pads and wire-bonds. The feedthrough pins are then connected to transducer electronics.

The disclosed pressure sensor design has several benefits. The removal of an oil-filled isolator eliminates costly and bulky materials used in prior art. Glass pins are no longer required to feedthrough an electrical signal. Moreover, the placement of an exposed diaphragm allows for the elimination of wells and cavities in which foreign object damage can occur. Overall, the cost of the product is reduced, the manufacturing process is better, and the performance of the pressure sensor is improved.

Discussion of Possible Embodiments

The following are non-exclusive descriptions of possible embodiments of the present invention.

A pressure sensor according to an exemplary embodiment of this disclosure, among other possible things includes a housing, a diaphragm wafer, and an isolator configured to absorb lateral stress. The diaphragm wafer comprises a fluid contact surface, a diaphragm located along the surface and configured to deflect in response to pressure, a sensing element that is responsive to deflection of the diaphragm, and a support portion, wherein the support portion and the diaphragm define a cavity. The isolator is connected between the support portion of the diaphragm wafer and the housing such that an inner portion of the isolator is attached to the support portion and an outer portion of the isolator is attached to the housing, and the isolator is parallel to the fluid contact surface.

The pressure sensor of the preceding paragraph can optionally include, additionally and/or alternatively, any one or more of the following features, configurations and/or additional components:

The housing comprises a housing end and a sidewall.

The housing includes a back plate.

The housing includes a weld feature configured to allow attachment of the pressure sensor to transducer electronics.

The sensing element is a piezoresistive device or capacitive plates.

The isolator is comprised of a material selected from the group consisting of an iron-nickel alloy, silicon, glass, ceramic and stainless steel foil, or a combination thereof.

The isolator attaches to the diaphragm wafer at the widest end of the cavity and the cavity converges to the apex from the isolator to the diaphragm.

The cavity retains a uniform cross-sectional area.

The diaphragm wafer and the isolator are a monolithic structure.

The isolator is coated such that it can be bonded to the housing and attached to the diaphragm wafer.

The pressure sensor includes a topping wafer attached to the diaphragm wafer and configured to provide reference pressure.

The pressure sensor includes an over-pressure stop rigidly attached to the housing, and configured to prevent over-pressurization of the pressure sensor.

The pressure sensor includes tubing configured to allow gage pressure measurements.

The pressure sensor includes a connector configured to transmit data, wherein the connector is located in the back plate of the housing, one or more wire-bonds, and one or more printed circuit boards attached to the connector where the printed circuit boards are attached to the diaphragm wafer through the one or more wire-bonds.

The pressure sensor includes at least one electrical feedthrough pin that runs through the housing and is electrically connected to the sensing element.

The pressure sensor includes a seal which is configured to electrically insulate the at least one electrical feedthrough pin where it runs through the housing.

A method for creating a pressure sensor according to an exemplary embodiment of this disclosure, among other possible things includes fabricating a diaphragm wafer comprising a fluid contact surface, a diaphragm located along the surface and configured to deflect in response to pressure, a sensing element that is responsive to deflection of the diaphragm, and a support portion, wherein the support portion and the diaphragm define a cavity; fabricating an isolator configured to absorb lateral stresses; fabricating a housing; connecting the isolator to the housing; and attaching the diaphragm wafer to the isolator, such that the support portion of the diaphragm wafer is attached to an inner portion of the isolator, an outer portion of the isolator is attached to the housing, and the fluid contact surface of the diaphragm wafer is parallel to the isolator.

The method of the preceding paragraph can optionally include, additionally and/or alternatively, any one or more of the following features, configurations and/or additional components:

The method includes fabricating a topping wafer configured to provide reference pressure, fabricating an over-pressure stop and over pressure support, attaching a topping wafer to the diaphragm wafer, attaching an over-pressure support to the topping wafer, and rigidly attaching the over-pressure support to the housing.

The method includes attaching at least one printed circuit board to the housing, attaching the at least one printed circuit board to the diaphragm wafer through at least one wire-bond, connecting the at least one printed circuit board to a connector through at least one wire, and attaching the connector along the housing.

The method includes chemically milling at least one hole in the isolator, bonding the sensing element of the diaphragm wafer to at least one electrical feedthrough pin, running the at least one electrical feedthrough pin through the at least one hole in the isolator, sealing the at least one hole, and connecting the at least one electrical feedthrough pin to a transducer electronics.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure sensor comprising:
   a housing;
   a diaphragm wafer comprising:
      a fluid contact surface;
      a diaphragm located along the surface and configured to deflect in response to pressure;
      a sensing element that is responsive to deflection of the diaphragm; and
      a support portion, wherein the support portion and the diaphragm define a cavity; and
   an isolator configured to absorb lateral stresses comprising:
      an opening configured to allow communication between an external fluid and the diaphragm;
      an inner portion defining the opening, the inner portion attached to the diaphragm wafer; and
      an outer portion extending laterally to and connecting to the housing, wherein the outer portion extends laterally beyond the diaphragm wafer.

2. The pressure sensor of claim 1, wherein the housing comprises a housing end and a sidewall.

3. The pressure sensor of claim 2, wherein the housing includes a back plate.

4. The pressure sensor of claim 1, wherein the housing includes a weld feature configured to allow attachment of the pressure sensor to transducer electronics.

5. The pressure sensor of claim 1, wherein the sensing element is a piezoresistive device or capacitive plates.

6. The pressure sensor of claim 1, wherein the isolator is comprised of a material selected from the group consisting of an iron-nickel alloy, silicon, glass, ceramic and stainless steel foil, or a combination thereof.

7. The pressure sensor of claim 1, wherein the isolator attaches to the diaphragm wafer at a widest end of the cavity and the cavity converges to an apex from the isolator to the diaphragm.

8. The pressure sensor of claim 1, wherein the cavity retains a uniform cross-sectional area.

9. The pressure sensor of claim 1, wherein the diaphragm wafer and the isolator are a monolithic structure.

10. The pressure sensor of claim 1, wherein the isolator is coated such that it maintains a strong bond to the housing and the diaphragm wafer.

11. The pressure sensor of claim 1 and further comprising a topping wafer attached to the diaphragm wafer and configured to provide reference pressure.

12. The pressure sensor of claim 1 and further comprising an over pressure support rigidly attached to the housing and the topping wafer, and configured to prevent over-pressurization of the pressure sensor.

13. The pressure sensor of claim 1, further comprising tubing configured to allow gage pressure measurements.

14. The pressure sensor of claim 1, further comprising:
   a connector attached to the housing;
   one or more wire-bonds; and
   one or more printed circuit boards attached to the connector, and attached to the diaphragm wafer through the one or more wire-bonds.

15. The pressure sensor of claim 1, further comprising at least one electrical feedthrough pin that runs through the housing and is electrically connected to the sensing element.

16. The pressure sensor of claim 15, and further comprising a seal, which is configured to electrically insulate the at least one electrical feedthrough pin where it runs through the housing.

17. A method for creating a pressure sensor, the method comprising:
   fabricating a diaphragm wafer comprising a fluid contact surface, a diaphragm located along the surface and configured to deflect in response to pressure, a sensing element that is responsive to deflection of the diaphragm, and a support portion, wherein the support portion and the diaphragm define a cavity;
   fabricating a housing;
   fabricating an isolator configured to absorb lateral stresses, the isolator comprising:
      an opening configured to allow communication between an external fluid and the diaphragm;
      an inner portion defining the opening, the inner portion for attaching to the diaphragm wafer; and
      an outer portion extending laterally for connecting to the housing, wherein the outer portion extends laterally beyond a width of the diaphragm wafer;
   connecting the isolator to the housing; and
   attaching the diaphragm wafer to the isolator, such that the support portion of the diaphragm wafer is attached to an inner portion of the isolator, an outer portion of the isolator is attached to the housing, and the fluid contact surface of the diaphragm wafer is parallel to the isolator.

18. The method of claim 17, and further comprising:
fabricating a topping wafer configured to provide reference pressure;
fabricating an over-pressure support;
attaching a topping wafer to the diaphragm wafer;
attaching an over-pressure support to the topping wafer; and
rigidly attaching the over-pressure support to the housing.

19. The method of claim 17, and further comprising:
attaching at least one printed circuit board to the housing;
attaching the at least one printed circuit board to the diaphragm wafer through at least one wire-bond;
connecting the at least one printed circuit boards to a connector through at least one wire; and
attaching the connector along the housing.

20. The method of claim 17, and further comprising:
chemically milling at least one hole in the isolator;
bonding the sensing element of the diaphragm wafer to at least one electrical feedthrough pin;
running the at least one electrical feedthrough pin through the at least one hole in the isolator;
sealing the at least one hole; and
connecting the at least one electrical feedthrough pin to a transducer electronics.

* * * * *